(12) United States Patent
Higaki

(10) Patent No.: US 10,809,344 B2
(45) Date of Patent: Oct. 20, 2020

(54) RADIO WAVE INCOMING DIRECTION ESTIMATION APPARATUS, ARRAY ANTENNA, RADIO WAVE INCOMING DIRECTION ESTIMATION METHOD

(71) Applicant: KABUSHIKI KAISHA TOSHIBA, Tokyo (JP)

(72) Inventor: Makoto Higaki, Setagaya Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 299 days.

(21) Appl. No.: 15/915,910

(22) Filed: Mar. 8, 2018

(65) Prior Publication Data

US 2019/0113596 A1 Apr. 18, 2019

(30) Foreign Application Priority Data

Oct. 16, 2017 (JP) ................................. 2017-200352

(51) Int. Cl.
*G01S 3/04* (2006.01)
*G01S 3/16* (2006.01)

(52) U.S. Cl.
CPC ................ *G01S 3/043* (2013.01); *G01S 3/16* (2013.01)

(58) Field of Classification Search
CPC .................................. G01S 3/043; G01S 3/16
See application file for complete search history.

(56) References Cited

U.S. PATENT DOCUMENTS

| 7,126,545 | B2 * | 10/2006 | Nagano | H01Q 1/243 |
| | | | | 343/702 |
| 10,567,063 | B1 * | 2/2020 | Bakeer | H04B 7/0682 |
| 2002/0135522 | A1 * | 9/2002 | Yamamoto | H01Q 1/007 |
| | | | | 343/702 |
| 2008/0082231 | A1 * | 4/2008 | Okabe | G01C 21/26 |
| | | | | 701/33.4 |
| 2009/0271108 | A1 * | 10/2009 | Kobori | G01C 21/30 |
| | | | | 701/532 |
| 2018/0088339 | A1 * | 3/2018 | Aruga | G01S 19/53 |
| 2018/0123239 | A1 * | 5/2018 | Long | H01Q 3/28 |

FOREIGN PATENT DOCUMENTS

| JP | H10-170621 A | 6/1998 |
| JP | 2008-124595 A | 5/2008 |
| JP | 2008131252 A * | 6/2008 |

* cited by examiner

*Primary Examiner* — Mamadou L Diallo
(74) *Attorney, Agent, or Firm* — Finnegan, Henderson, Farabow, Garrett & Dunner, L.L.P.

(57) ABSTRACT

A radio wave incoming direction estimation apparatus according to an aspect of the present invention estimates an incoming direction of an incoming radio wave reaching an array antenna apparatus including a plurality of antennas. The radio wave incoming direction estimation apparatus includes a virtual current calculator, and an incoming direction estimator. The virtual current calculator calculates a virtual current at each antenna from a received current that is generated at each of the antennas by the incoming radio wave on the basis of data indicating a relationship between supplied power to each of the antennas and a current that is generated at each of the antennas by the supplied power. The incoming direction estimator estimates the incoming direction of the incoming radio wave on the basis of the virtual current at each of the antennas.

7 Claims, 8 Drawing Sheets

RADIO WAVE INCOMING DIRECTION ESTIMATION APPARATUS, ARRAY ANTENNA, RADIO WAVE INCOMING DIRECTION ESTIMATION METHOD

CROSS-REFERENCE TO RELATED APPLICATION (S)

This application is based upon and claims the benefit of priority from Japanese Patent Application No. 2017-200352, filed Oct. 16, 2017; the entire contents of which are incorporated herein by reference.

FIELD

An embodiment relates to a radio wave incoming direction estimation apparatus, an array antenna, and a radio wave incoming direction estimation method.

BACKGROUND

By estimating an incoming direction of a radio wave by using a plurality of antennas, a transmission direction of the radio wave can be identified. To increase the accuracy of estimation of the incoming direction of a radio wave, errors caused due to a use environment and the like have to be removed. Various methods have been conceived for this purpose, but conventional methods include problems regarding cost and estimation accuracy.

For example, there is a method in which receiving a reference signal by a plurality of receiving array antennas, the reference signal being transmitted from an antenna different from the receiving array antennas, and calibrating a calculation result of estimation of the incoming direction of a measurement target radio wave on the basis of the received reference signals. According to this method, in the case where the reference signal is carried by a radio wave which is emitted from a long distance from the receiving array antennas, a large scale measurement has to be performed in an anechoic chamber or the like, and the cost increases. In contrast, in the case where the reference signal is carried by a radio wave which is emitted from a short distance from the receiving array antennas, an error is caused with respect to a property of a radio wave which comes from afar and which is to be actually estimated, and the accuracy of estimation is reduced.

DETAILED DESCRIPTION

An embodiment of the present invention estimates an incoming direction of a radio wave, on the basis of currents that are assumed to be generated at antennas by an incoming radio wave in a case where it is assumed that there is no influence from another antenna.

A radio wave incoming direction estimation apparatus according to an aspect of the present invention estimates an incoming direction of an incoming radio wave reaching an array antenna apparatus including a plurality of antennas. The radio wave incoming direction estimation apparatus includes a virtual current calculator, and an incoming direction estimator. The virtual current calculator calculates a virtual current at each antenna from a received current that is generated at each of the antennas by the incoming radio wave on the basis of data indicating a relationship between supplied power to each of the antennas and a current that is generated at each of the antennas by the supplied power. The incoming direction estimator estimates the incoming direction of the incoming radio wave on the basis of the virtual current at each of the antennas.

An embodiment will be explained in detail below with reference to the accompanying drawings. The present invention is not limited to the embodiment.

(An Embodiment of Present Invention)

Figure 1:
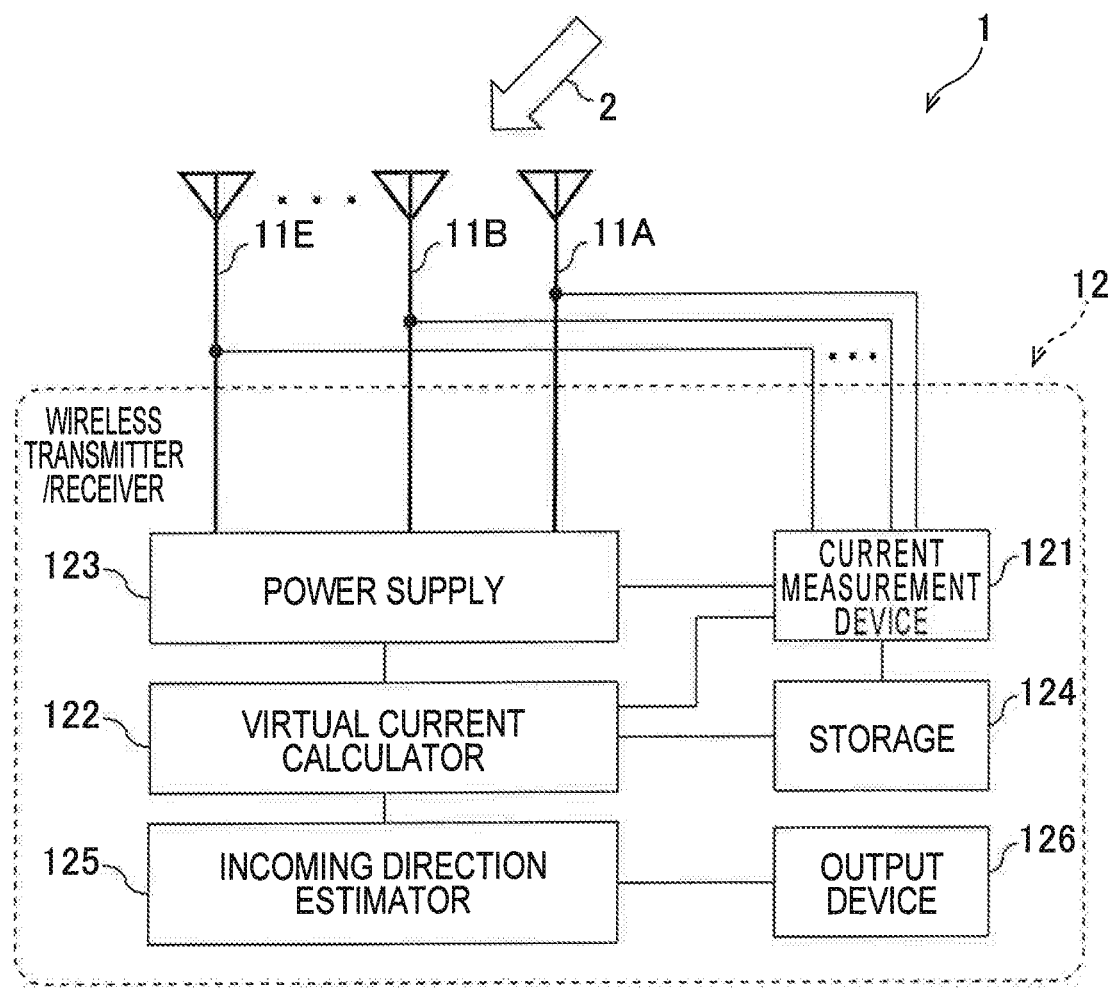
FIG. 1 is a block diagram illustrating an example of a schematic configuration of an array antenna apparatus according to an embodiment of the present invention.

FIG. 1 is a block diagram illustrating an example of a schematic configuration of an array antenna apparatus according to an embodiment of the present invention. An array antenna apparatus 1 according to the present embodiment includes a plurality of antennas 11, and a wireless transmitter/receiver 12. The wireless transmitter/receiver 12 includes a current measurement device 121, a virtual current calculator 122, a power supply 123, a storage 124, an incoming direction estimator 125, and an output device 126.

The array antenna apparatus 1 according to the present embodiment not only performs wireless transmission but also performs estimation of an incoming direction of an incoming radio wave which has reached the array antenna apparatus 1. An arrow in FIG. 1 indicates a propagation direction of an incoming radio wave 2. Incidentally, the configuration illustrated in FIG. 1 is a configuration for incoming direction estimation, and components for other purposes are omitted. Accordingly, the array antenna apparatus 1 may include other components. Moreover, each component illustrated in FIG. 1 may be provided in plurality. For example, the current measurement device 121 and the power supply 123 are each illustrated as one component, but may be provided for each or several of antennas 11. Alternatively, the current measurement device 121 may be present at each current measurement position.

The antenna 11 may be a well-known antenna, and the type of the antenna is not particularly limited. For example, a monopole antenna, an inverted-L antenna, or an inverted-F antenna (the inverted-L antenna with a short-circuit line) may be used. Furthermore, the shape and the configuration of the antenna 11 may be changed according to the purpose of use, the status of use and the like of the array antenna apparatus 1.

A suffix letter of the reference sign of the antenna 11 is added for identification of each of the antennas with the same reference sign. Incidentally, in the example in FIG. 1, five antennas of antennas 11A to 11E are illustrated, but the number of antennas 11 is not particularly limited.

The wireless transmitter/receiver 12 is an appliance that performs the following so as to perform wireless communication with an external wireless communication apparatus: modulating a high-frequency radio signal; transmitting the signal; and demodulating a received radio signal. In the present embodiment, the wireless transmitter/receiver 12 also receives a current (signal) that is generated at each antenna 11 by an incoming radio wave, and estimates an incoming direction of the incoming radio wave on the basis of these currents. Accordingly, the array antenna apparatus 1 and the wireless transmitter/receiver 12 may be said to be a radio wave incoming direction estimation apparatus. A current (signal) that is generated at each antenna 11 by an incoming radio wave will be referred to as a received current (received signal).

Moreover, the wireless transmitter/receiver 12 is capable of supplying power to each antenna 11. In the present embodiment, supply of power is also used to examine the degree of influence between the antennas 11.

Estimation of an incoming direction of an incoming radio wave will be described, together with an internal configuration of the wireless transmitter/receiver 12. The current measurement device 121 measures a current flowing in each antenna 11. Properties of the current are thereby made known. Incidentally, properties of the current include an amplitude and a phase thereof.

As the current measurement device 121, a well-known appliance may be used. For example, a current detector including a semiconductor such as a detector diode may be used. Moreover, the current measurement device 121 may incorporate a filter such as a low-pass filter, and may remove a noise in a measured current by the filter.

The virtual current calculator 122 calculates a virtual current of each antenna 11 from a received current that is generated at the antenna 11 by an incoming radio wave on the basis of data indicating a relationship between supplied power to the antenna 11 and a current that is generated at the antenna 11 by the supplied power. The virtual current refers to a current that is estimated to be generated at an existing antenna 11 by an incoming radio wave when assuming that only one antenna 11 of the antennas 11 exists and other antennas 11 do not. Furthermore, the aforementioned data is acquired in advance before incoming direction estimation is performed. In the following, supply of power that is performed to acquire the aforementioned data will be referred to as test power supply, and the aforementioned data will be referred to as test power supply data.

Because the antennas 11 interfere with one another, properties of the received current are different between a case where there is one antenna 11 and a case where there is a plurality of antennas 11. That is, the received current at each antenna 11 includes influence of other antennas 11. Accordingly, an error is great if the incoming direction is estimated on the basis of the received current. Therefore, in the present embodiment, the incoming direction is estimated using the virtual current instead of the received current. The influence from other antennas 11 is thereby cancelled, and the accuracy of estimation of the incoming direction is increased.

On the other hand, an antenna 11 through which a current is not flowing does not interfere with other antennas 11, and thus, can be assumed as not existing with respect to current measurement. Accordingly, in a state where one of the plurality of antennas 11 is selected and no current is flowing in the non-selected antennas, a current flowing in the selected antenna may be assumed to be the virtual current. That is, the virtual current refers to a transformed current at a selected antenna among a plurality of antennas when performing numerical transformation on received currents at the plurality of antennas such that the received currents at the antennas other than the selected one of the plurality of antennas become zero.

For example, the received current is given as "$I_r$", and the received currents flowing in "n" antennas 11 (where "n" is a positive integer) are given as $\{I_{r1}, I_{r2}, \ldots, I_{rn}\}$. In the case where a first antenna 11 is selected, the values after numerical transformation by the virtual current calculator 122 will be $\{I_{r1}', 0, 0, \ldots, 0\}$. In the case where a second antenna 11 is selected, the values will be $\{0, I_{r2}', 0, \ldots, 0\}$. In this manner, numerical transformation is repeated while changing the selected antenna 11, and virtual currents $I_{r1}'$ to $I_{rn}'$) of all the antennas 11 are calculated.

A description will be given of the test power supply data. The test power supply data is acquired by supplying power (exciting) to the antenna 11. In the same way as where a current is generated at other antennas 11 by interference when a certain antenna 11 receives a radio wave, a current is generated at other antennas 11 by interference also when power is supplied to the certain antenna 11. Accordingly, in the present embodiment, the test power supply data is actively acquired by exciting each antenna 11.

To acquire the test power supply data, the power supply 123 performs test power supply to the plurality of antennas 11. In the test power supply, the power supply 123 performs adjustment such that a current flows in one selected antenna and a current does not flow in other non-selected antennas. Then, the current measurement device 121 measures the current at each antenna 11 generated by the test power supply. The current generated at the antenna 11 by the test power supply will be referred to as a test reception current. That is, the test reception current at a non-selected antenna 11 is zero.

The power supply 123 performs the test power supply while changing the selected antenna. In the case where there are "n" antennas, the test power supply is performed "n" times, and the selected antenna is different in each test power supply. The test power supply data is thus acquired. Incidentally, data related to supply of power in the test power supply data may be a voltage that is applied to the antenna, a current that is assumed to flow in the antenna, or power.

Figure 2:
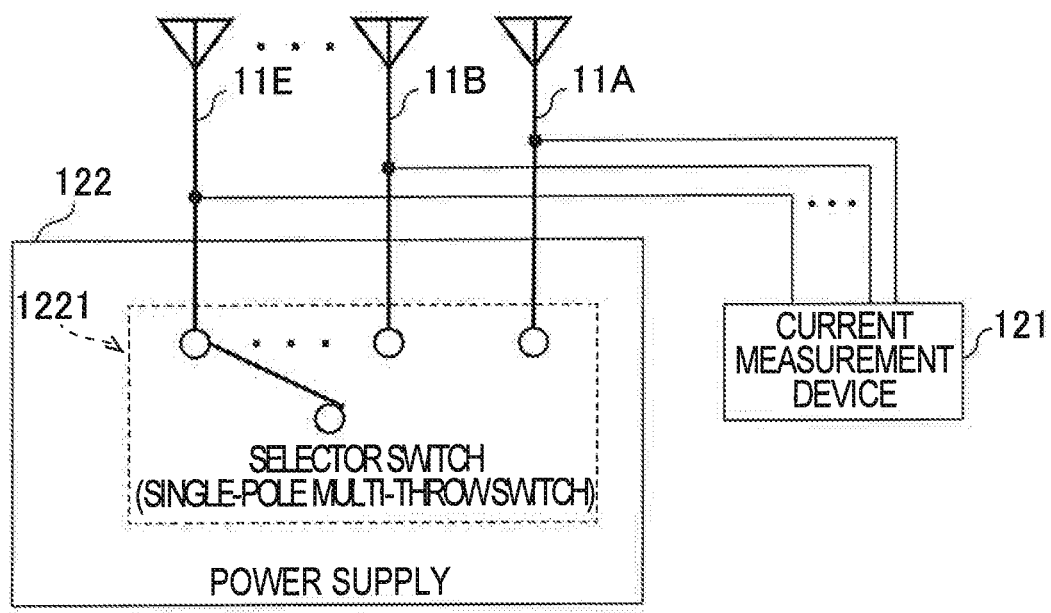
FIG. 2 is a diagram illustrating an example of supply of power by a single-pole multi-throw switch.

Incidentally, as described above, the power supply 123 may be provided at each antenna 11, or there may be one power supply 123. In the case where there is one power supply 123, the antenna 11 which is the power supply target may be switched by using a single-pole multi-throw switch or the like. FIG. 2 is a diagram illustrating an example of supply of power by a single-pole multi-throw switch. In the case where a single-pole multi-throw switch 1221 is provided, the single-pole multi-throw switch 1221 performs switching in the test power supply such that the antenna 11 electronically connected to the power supply 123 is the antenna 11 which is the target of supply. In the test power supply where the single-pole multi-throw switch 1221 is provided, the power supply 123 supplies power to only one target antenna 11 among the plurality of antennas 11. The antenna 11 which is the target of supply is switched in turn, and supply of power is performed for all the antennas 11 as a result. In the measurement result obtained in this case, a current flow in every antenna, but the data only have to be transformed by computation to data in which a current flow in only one antenna and current values of other antennas are zero. The test power supply data may be acquired in this manner.

Incidentally, properties of a test reception current measured by the current measurement device 121 are the properties at the position of the antenna 11 where measurement was performed by the current measurement device 121. Hence, the position where the current measurement device 121 measures the test reception current at each antenna 11 becomes important. For example, in the case where measurement is performed at a terminal of the antenna 11, even if the current value is zero at the terminal, the current value is possibly not zero at other positions. Accordingly, the estimation accuracy of the incoming direction is different between a case where the test power supply data measured at the terminal of the antenna 11 is used and a case where the test power supply data measured at around the center in the longitudinal direction of the antenna 11 is used. A change in the estimation accuracy depending on the measurement position will be described later in detail.

The current measurement device 121 may be separated into a current measurement device 121 for measuring the received current and a current measurement device 121 for measuring the test reception current. In this case, it is enough if the current measurement device 121 for measuring the test reception current is connected to the antenna 11 at the time of measurement of the test reception current.

Figure 3:
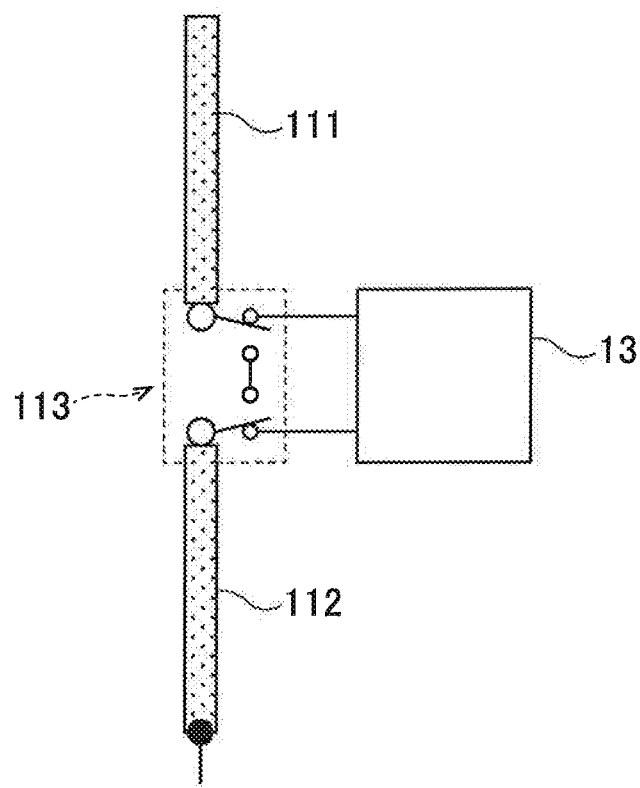
FIG. 3 is a diagram illustrating an example of measurement of a test reception current.

FIG. 3 is a diagram illustrating an example of measurement of the test reception current. In the example in FIG. 3, the antenna 11 includes two antenna elements 111 and 112 which are linear conductive wires. A double-pole double-throw switch 113 and a current measurer 13 are also illustrated. The double-pole double-throw switch 113 switches between direct connecting (shorting) of the antenna elements 111 and 112, and connecting of the two via the current measurer 13. In this case, the connection portion between the antenna element 111 or 112 and the double-pole double-throw switch 113 is the measurement point of the test reception current. Incidentally, in the example in FIG. 3, the current measurer 13 may be provided at each antenna 11, and the antenna 11 may be an antenna unit including the double-pole double-throw switch 113, the current measurer 13, and the like.

Furthermore, a current measurer for measuring the test reception current may be attached to a measurement point of the antenna 11 at the time of measurement of the test reception current. That is, the test reception current may be measured by a current measurer provided outside the array antenna apparatus 1, and the array antenna apparatus 1 may acquire the measurement result of the current measurer.

The storage 124 stores the test power supply data acquired by test power supply. Incidentally, as described above, the stored test power supply data may be acquired from an external apparatus. The storage 124 transfers the test power supply data to the virtual current calculator 122 in response to a request from the virtual current calculator 122. Incidentally, information to be stored in the storage 124 is not particularly limited, and information other than test power supply may also be stored.

The virtual current calculator 122 calculates a virtual current from a received current on the basis of the test power supply data. In other words, an actual measurement value of a received current which has been measured is numerically transformed into a virtual value. Various methods are conceivable with respect to calculation of the virtual current. For example, in the case where there are "n" antennas 11, a coefficient $\alpha_{(n \times n)}$ of an n×n matrix is calculated in "n" test power supplies on the basis of $I_{t(n \times n)}$ of the n×n matrix and $I_{t'(n \times n)}$ of a diagonal matrix of n×n, $I_{t(n \times n)}$ indicating an assumed current supplied to the "n" antennas 11, and $I_{t'(n \times n)}$ indicating the test reception currents actually measured at the "n" antennas 11. Then, a virtual current $I_{r'(n \times 1)}$ of an n×1 matrix may be calculated from a received current $I_{r(n \times 1)}$ of the n×1 matrix by using the coefficient $\alpha_{(N \times n)}$. Alternatively, an array antenna model is created by performing a simulation based on the test power supply data. The virtual current may be calculated from the received current on the basis of the array antenna model.

Figure 4:
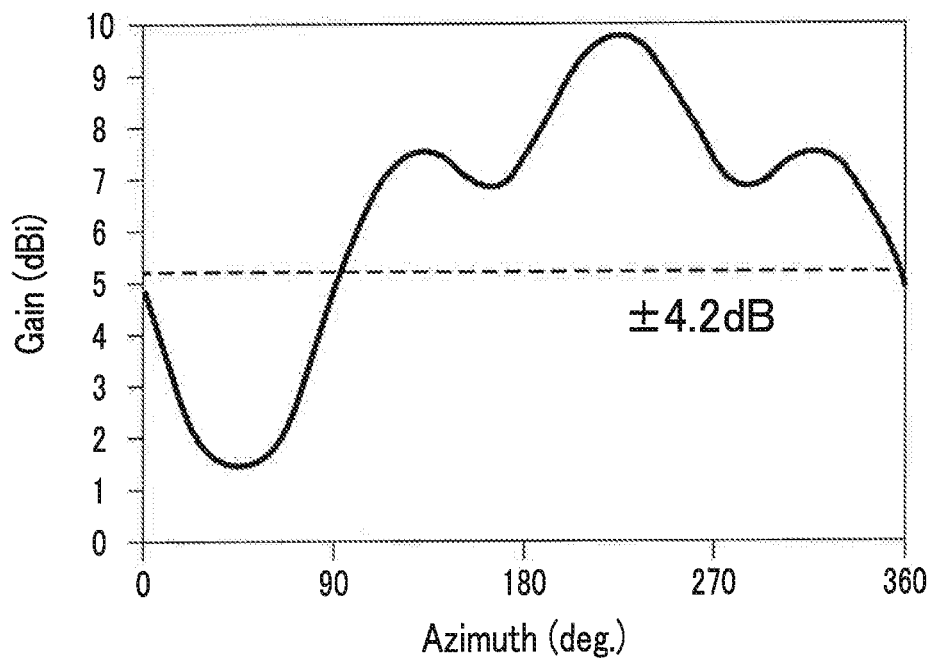
FIG. 4 is a diagram illustrating a relationship between a received current and an ideal current.
Figure 4:
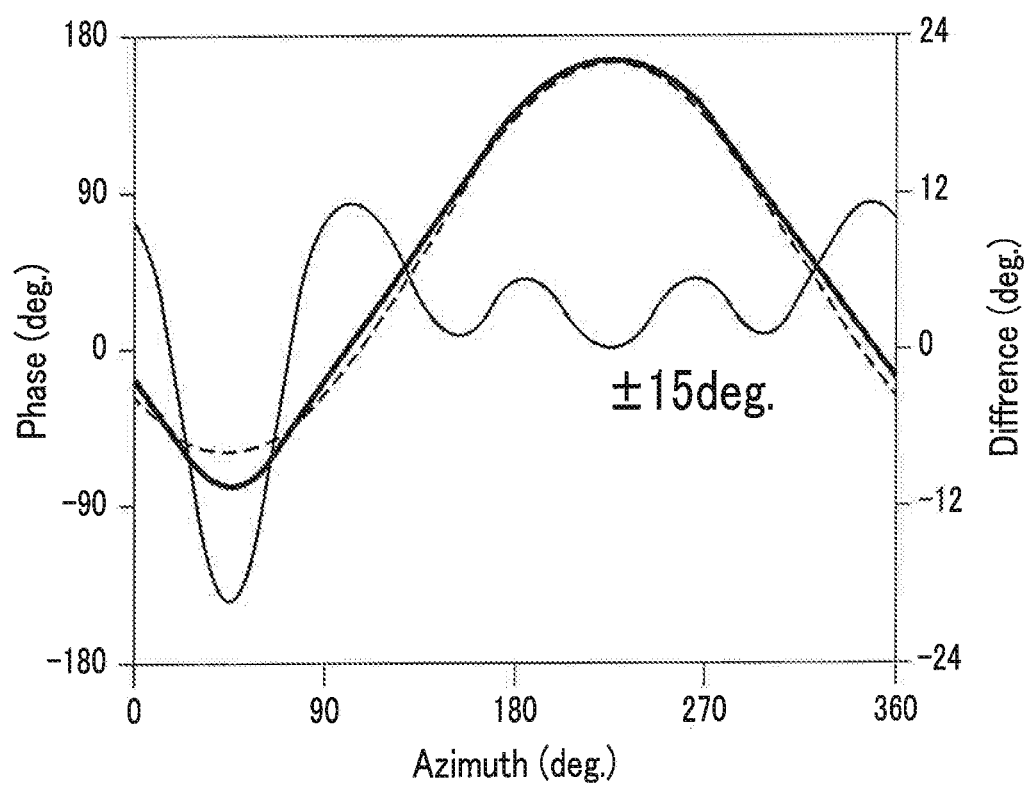
Figure 5:
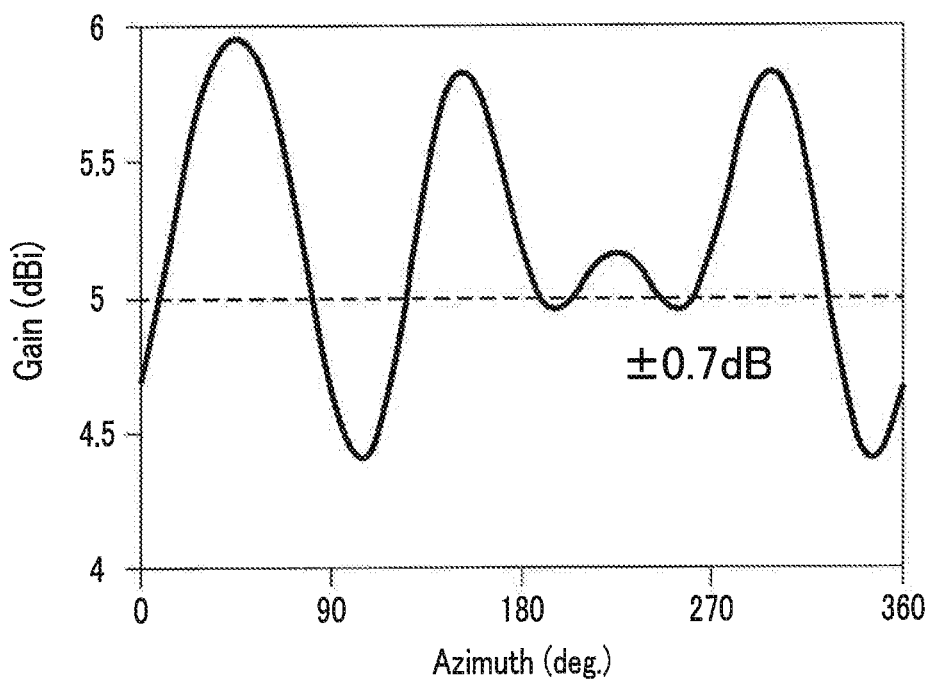
FIG. 5 is a diagram illustrating a relationship between an ideal current and a virtual current, the virtual current being based on test power supply data where a current at an antenna terminal is measured.
Figure 5:
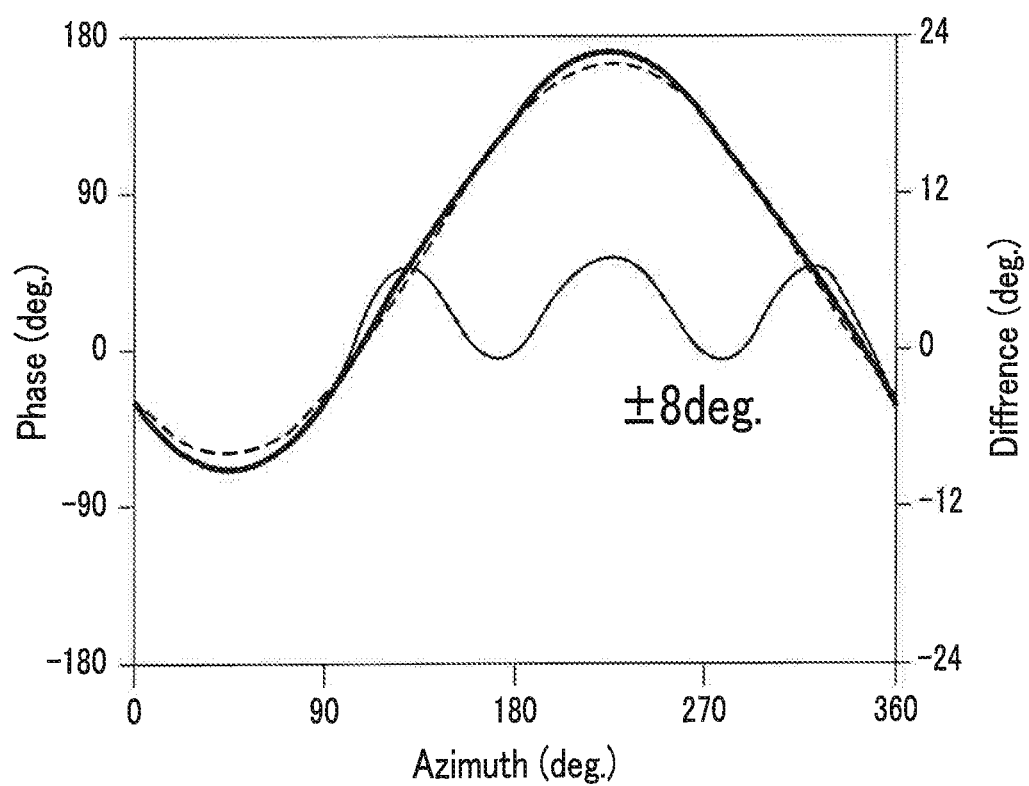
Figure 6:
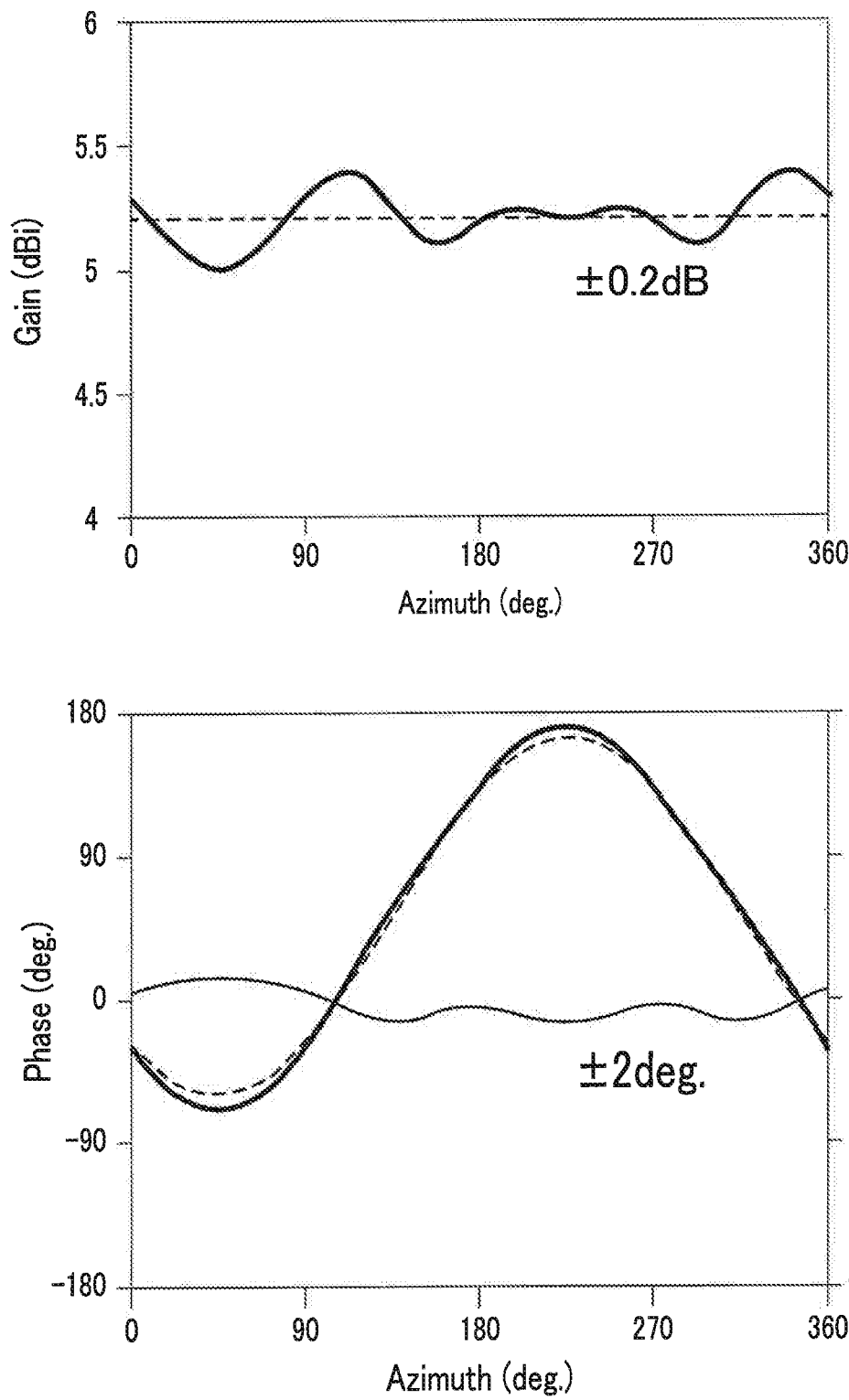
FIG. 6 is a diagram illustrating a relationship between an ideal current and a virtual current, the virtual current being based on test power supply data where a current at an antenna center is measured.

FIGS. 4 to 6 are diagrams describing an effect of using the virtual current in incoming direction estimation. FIG. 4 is a diagram illustrating a relationship between a received current and an ideal current. The ideal current is a current that is generated by an incoming radio wave in a case where there are no other antennas 11, and is an ideal virtual current. FIG. 5 is a diagram illustrating a relationship between an ideal current and a virtual current, the virtual current being based on test power supply data where a current at an antenna terminal is measured. FIG. 6 is a diagram illustrating a relationship between an ideal current and a virtual current, the virtual current being based on test power supply data where a current at an antenna center is measured. In FIGS. 4 to 6, a graph related to a gain is illustrated on the top, and a graph related to a phase is illustrated on the bottom. Moreover, a thick solid line indicates the virtual current, a dotted line indicates the ideal current, and a thin solid line indicates the difference between the virtual current and the ideal current.

As illustrated in FIG. 4, a largest gain difference between a measured current and the ideal current is 4.2 dB, and a largest phase difference is about 15 degrees. On the other hand, in FIG. 5, a largest gain difference between the virtual current and the ideal current is about 0.7 dB, and a largest phase difference is about 8 degrees. Thus, it can be seen that the virtual current is closer to the ideal current.

Furthermore, in FIG. 6, a largest gain difference between the virtual current and the ideal current is about 0.2 dB, and a largest phase difference is about 2 degrees. In this manner, the degree of deviation between the virtual current and the ideal current is different depending on the test power supply data used for calculation of the virtual current. The test power supply data to be used for calculation of the virtual current is preferably based on a current that is measured around the center in the longitudinal direction of the antenna 11. Accordingly, it is preferable that the measurement point is close to the center in the longitudinal direction of the antenna 11, and that the current value around the center is adjusted to zero.

In this manner, in the present embodiment, the virtual current calculator 122 calculates a virtual current with a smaller difference to a current that is generated at each antenna 11 by an incoming radio wave in a case where there are no other antennas 11. The estimation accuracy of the incoming direction of an incoming radio wave is thereby increased.

The incoming direction estimator 125 estimates the incoming direction of an incoming radio wave on the basis of the virtual current at each antenna 11. A well-known method may be used as the estimation method to be used by the incoming direction estimator 125. For example, the incoming direction estimator 125 may include a phase difference detector which detects a phase difference between virtual currents at respective antennas, and an incoming direction calculator which calculates the incoming direction of an incoming radio wave on the basis of the phase difference detected by the phase difference detector.

The output device 126 outputs the incoming direction of an incoming radio wave. Information to be output by the output device 126 is not particularly limited, and information other than the incoming direction may also be output. For example, data related to calculation of the incoming direction such as the test power supply data, the test reception current, the position of the antenna 11, the surrounding environment, and the processing data/time may also be output.

The output method of the output device 126 is not particularly limited. The output device 126 may display a processing result on a screen in the form of an image, or may output the processing result to an external apparatus in the form of a data file.

Figure 7A:
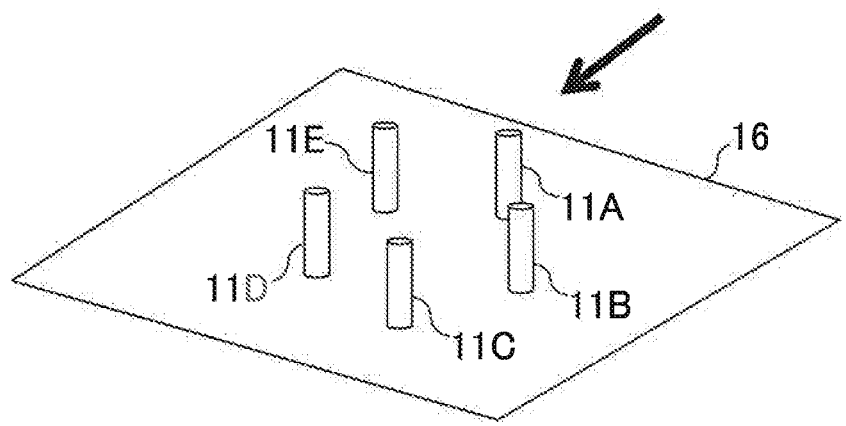
FIGS. 7A and 7B are diagrams illustrating an example of an actual configuration of the array antenna apparatus.
Figure 7B:
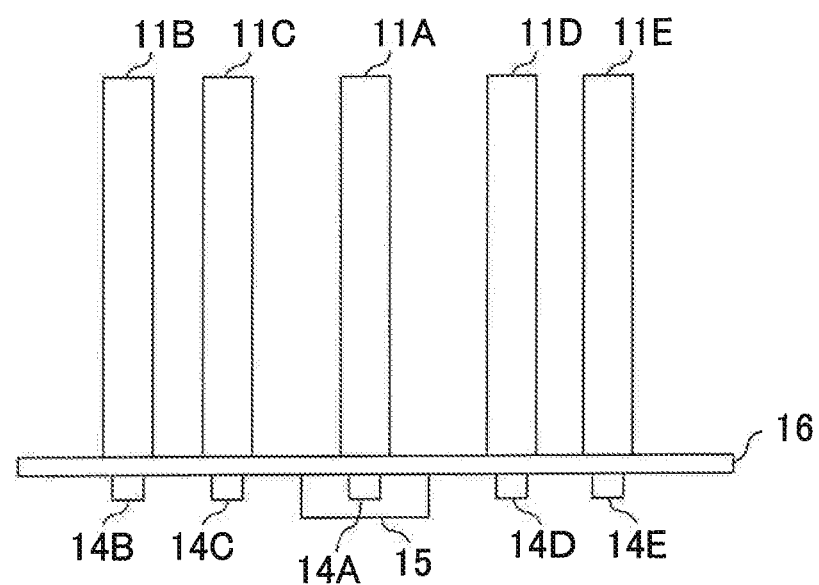

FIGS. 7A and 7B are diagrams illustrating an example of an actual configuration of the array antenna apparatus. FIG. 7A is a perspective view, and FIG. 7B is a side view. FIG. 7B is a diagram illustrating the array antenna apparatus 1 in the direction of an arrow illustrated in FIG. 7A.

In the example in FIGS. 7A and 7B, the wireless transmitter/receiver 12 is realized by two types of circuits: a first circuit 14 provided for each antenna 11; and a second circuit 15. The first circuit 14 is disposed immediately below the corresponding antenna 11, and supplies power to the corresponding antenna 11. That is, the first circuit 14 at least includes the power supply 123. The current measurement device 121 may also be included in the first circuit 14, or may be included in the antenna 11 (antenna unit). Incidentally, in the example in FIGS. 7A and 7B, power is assumed to be supplied to a terminal of the antenna 11 connected to the first circuit 14. That is, the terminal is the point of the supply of power.

The second circuit 15 is a circuit which estimates the incoming direction by acquiring information from the first circuit 14. That is, the second circuit 15 at least includes the incoming direction estimator 125. The virtual current calculator 122 may be provided in either of the first circuit 14 and the second circuit 15. In this manner, the wireless transmitter/receiver 12 may be configured from a plurality of appliances which are capable of exchanging data by electrical signals or communication.

A flat plate in contact with the circuits is a ground conductor plate 16 of a conductive material such as metal. The ground conductor plate 16 serves as a ground potential of a high-frequency circuit.

Figure 8:
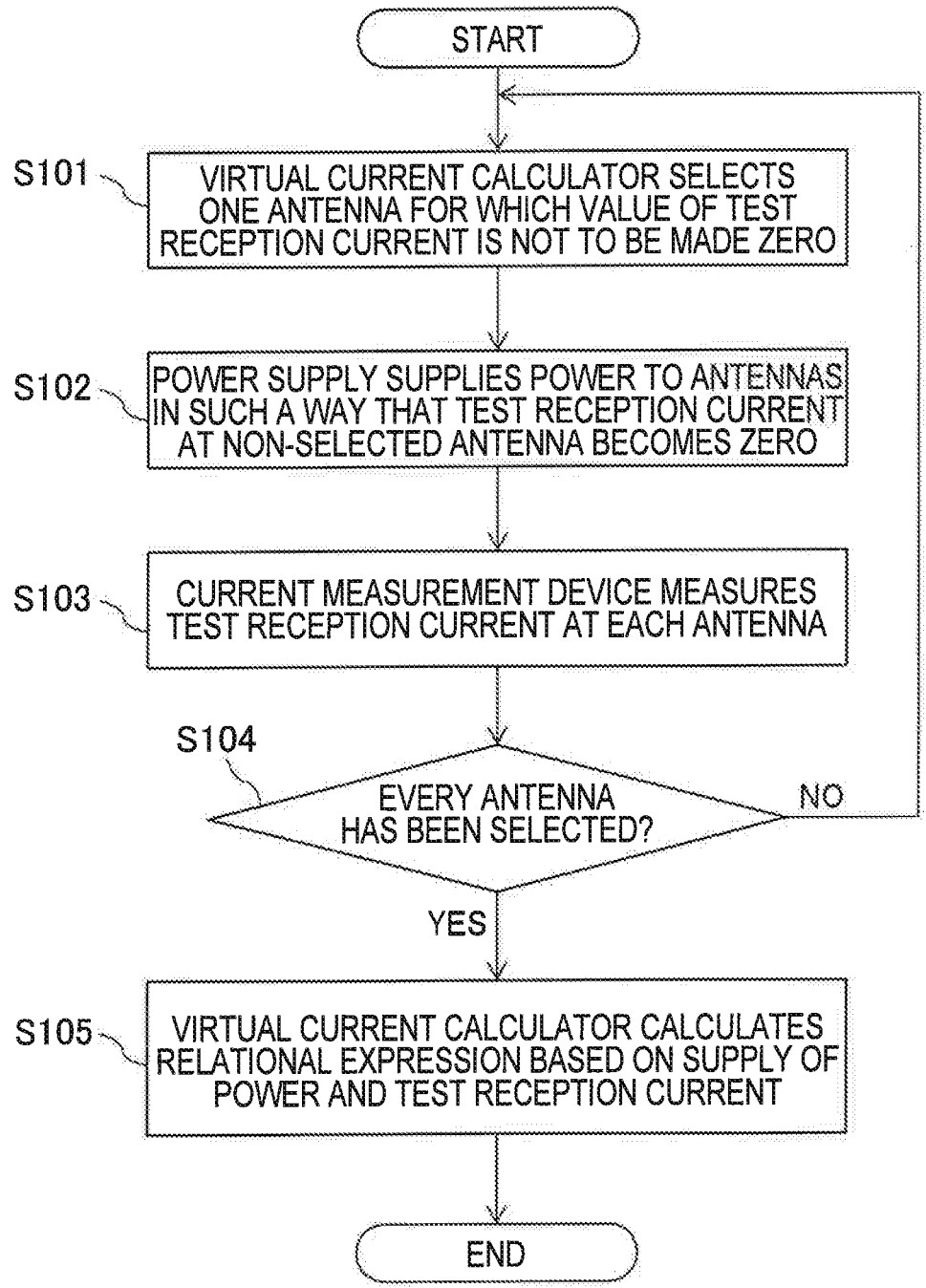
FIG. 8 is a diagram illustrating an example of a schematic flowchart of a test power supply process.

Next, a flow of processes by the components will be described. FIG. 8 is a diagram illustrating an example of a schematic flowchart of a test power supply process.

The virtual current calculator selects one antenna 11 where the value of the test reception current is not to be made zero (S101). Here, a previously selected antenna 11 is not to be selected. The power supply 123 performs test power supply to each antenna 11 in such a way that the test reception currents at non-selected antennas 11 become zero (S102). The current measurement device 121 measures the test reception current generated at each antenna 11 by the test power supply (S103).

In the case where not every antenna has been selected (S104: NO), the process of S101 is performed again, and a previously non-selected antenna is newly selected, and the processes of S102 and S103 are performed again. In the case where every antenna has been selected (S104: YES), the virtual current calculator 122 calculates a relational expression, a simulation model or the like for the supplied power and test reception currents, on the basis of the test power supply and the measured test reception currents (S105), and the test power supply is ended.

Figure 9:
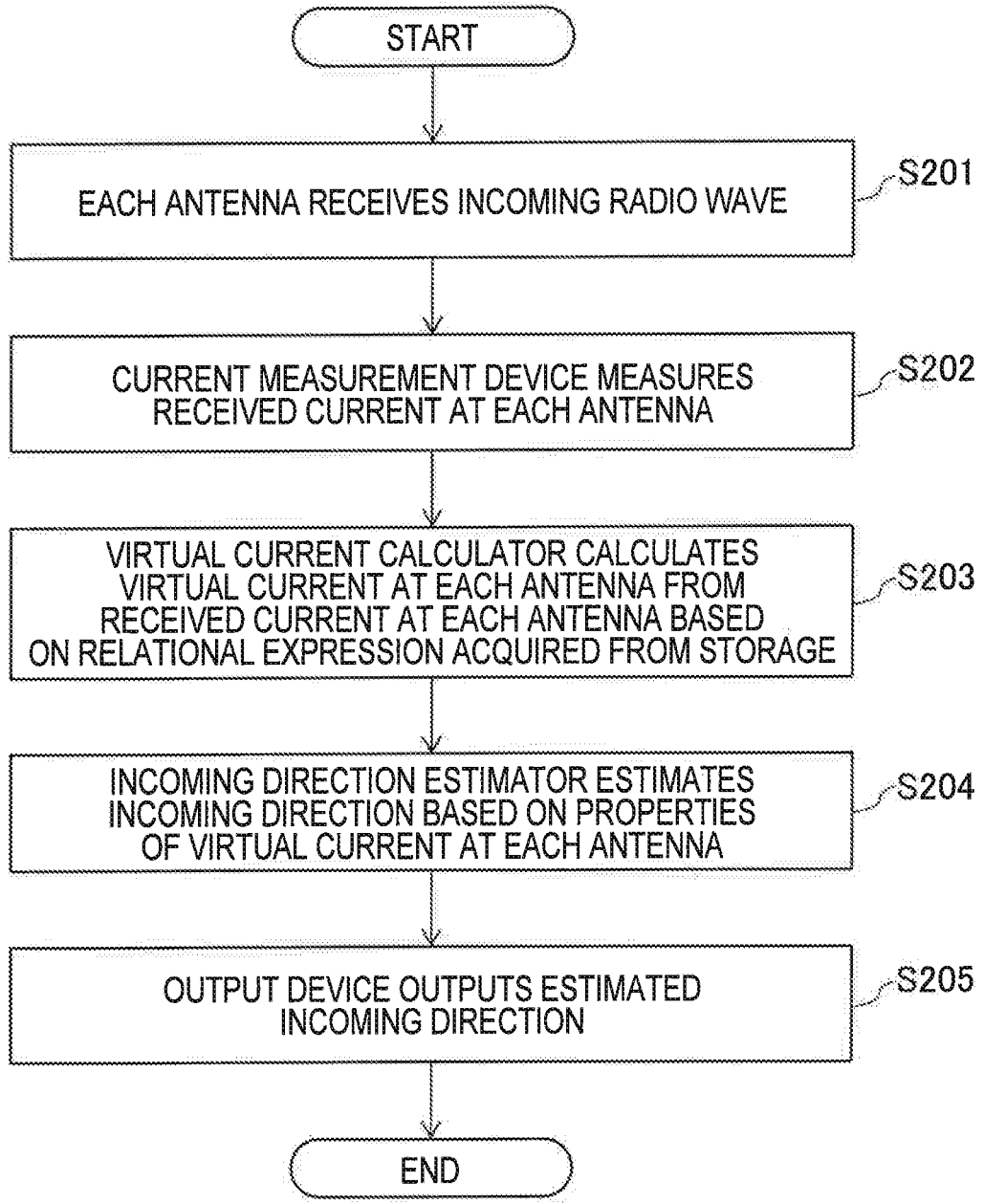
FIG. 9 is a diagram illustrating an example of a schematic flowchart of an estimation process of an incoming direction.

FIG. 9 is a diagram illustrating an example of a schematic flowchart of an estimation process of the incoming direction. The flow of calculation of the incoming direction is performed after the relational expression is calculated on the basis of the test power supply.

When each antenna 11 receives an incoming radio wave (S201), the current measurement device 121 measures the received current at each of the antennas 11 (S202). The virtual current calculator 122 calculates the virtual current at each antenna 11 from the received current at the antenna 11 on the basis of the relational expression or the like (S203). Information about the virtual current at each antenna 11 is transmitted to the incoming direction estimator 125, and the incoming direction estimator 125 estimates the incoming direction on the basis of the properties of the virtual current at each antenna 11 (S204). Then, the output device 126 outputs the estimated incoming direction to a specified output destination (S205). The estimation process of the incoming direction is thus completed, and a user or the like is enabled to grasp the incoming direction.

Incidentally, the flowcharts described above are examples, and the order of processes and the like are not limited thereto as long as a required processing result can be obtained. For example, the process of 5105 may be performed at a different timing from the others in the test power supply process as long as the process is performed before the estimation process of the incoming direction. Furthermore, the processing result of each process may be stored in the storage 124 in a sequential manner, and each component may acquire a processing result by referring to the storage 124.

As described above, according to the present embodiment, a current that is generated at an antenna 11 by an incoming radio wave is transformed into a virtual current which assumes that there is no influence from other antennas 11 on the basis of data of test power supply and test reception current. Then, the incoming direction of the incoming radio wave is estimated on the basis of the virtual current at each antenna 11. The accuracy of estimation of the incoming direction may thereby be increased.

Furthermore, according to the present embodiment, it is enough if the storage 124 stores data that is calculated by the components of the array antenna apparatus 1. Unlike conventional methods, the storage 124 does not have to store data such as a radiation pattern, a steering vector and the like for calibration of an estimated incoming direction. Accordingly, the array antenna apparatus 1 does not have to include a large-capacity memory, Incidentally, some or all of the components of the array antenna apparatus 1 according to the present embodiment may be realized by a dedicated electronic circuit (i.e., hardware), such as an integrated circuit (IC) on which a processor, a memory and the like are mounted. Alternatively, a component may be realized by using software (program). In the case of using software (program), the embodiment described above may be realized by using a general-purpose computer apparatus as basic hardware, and by causing a processor such as a central processing unit (CPU) mounted on the computer apparatus to execute programs.

Terms used in the present embodiment are to be broadly interpreted. For example, the term "processor" may include a general-purpose processor, a central processing unit (CPU), a microprocessor, a digital signal processor (DSP), a controller, a microcontroller, or a state machine. Depending on the situation, the "processor" may refer to an application specific integrated circuit, a field-programmable gate array (FPGA), a programmable logic device (PLD), or the like. The "processor" may refer to a combination of a plurality of processing apparatuses such as a plurality of microprocessors, a combination of a DSP and a microprocessor, or at least one microprocessor that cooperates with a DSP core.

In another example, the term "memory" may include any electronic component which is capable of storing electronic information. The "memory" may refer to a random access memory (RAM), a read-only memory (ROM), a programmable read-only memory (PROM), an erasable programmable read-only memory (EPROM), an electrically erasable PROM (EEPROM), a non-volatile random access memory (NVRAM), a flash memory, a magnetic or optical data storage, and these memories can be read by the processor. If the processor reads and/or writes information from the memory, the memory can be said to electrically communicate with the processor. The memory may be integrated in the processor, and also in this case, the memory can be said to electrically communicate with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An apparatus for estimating a direction of an incoming radio wave reaching a plurality of antennas, comprising:
a virtual current calculator configured to calculate a virtual current at each antenna from a received current that is generated at each of the antennas by the incoming radio wave on the basis of data indicating a relationship between supplied power to each of the antennas and a current that is generated at each of the antennas by the supplied power, the virtual current being an estimated current to be generated at one of the antennas by an incoming radio wave when assuming that the other antennas do not exist; and
an incoming direction estimator configured to estimate the incoming direction of the incoming radio wave on the basis of the virtual current at each of the antennas.

2. The apparatus according to claim 1, wherein the virtual current refers to a transformed current at one selected antenna among the antennas, when performing numerical transformation on the received currents at the antennas such that the received currents at antennas other than the one selected antenna become zero.

3. The apparatus according to claim 1, wherein each of the current that is generated at each of the antennas by the supplied power is measured at around a center in a longitudinal direction of each of the antennas.

4. An array antenna apparatus comprising:
the radio wave incoming direction estimation apparatus according to claim 1;
a power supply configured to supply the supplied power to the antennas; and
a current measurement device configured to measure currents flowing in the antennas by the supplied power, wherein
the data is based on the supplied power from the power supply and a measurement result of the current measurement device.

5. The array antenna apparatus according to claim 4, wherein the current measurement device is connected to the antennas around a center in a longitudinal direction of the antennas.

6. The array antenna apparatus according to claim 4, further comprising:
a single-pole multi-throw switch configured to connect the power supply and the antennas, wherein
the single-pole multi-throw switch performs switching such that an antenna electrically connected to the power supply is a target antenna that is a target of the supply, and
the supplied power is supplied only to the target antenna among the antennas.

7. A radio wave incoming direction estimation method for estimating an incoming direction of an incoming radio wave reaching an array antenna apparatus including a plurality of antennas, the radio wave incoming direction estimation method comprising:
calculating a virtual current at each antenna from a received current that is generated at each of the antennas by the incoming radio wave on the basis of data indicating a relationship between supplied power to each of the antennas and a current that is generated at each of the antennas by the supplied power, the virtual current being an estimated current to be generated at one of the antennas by an incoming radio wave when assuming that the other antennas do not exist; and
estimating the incoming direction of the incoming radio wave on the basis of the virtual current at each of the antennas.

* * * * *